United States Patent [19]

Arnoldi et al.

[11] 4,227,801
[45] Oct. 14, 1980

[54] DOCUMENT RECEIVER IN A DOCUMENT PROCESSING MACHINE

[75] Inventors: Douglas R. Arnoldi, Southbury; Antoon M. Hurkmans, Bethlehem; Wayne D. Tolman, Bethel, all of Conn.

[73] Assignee: Burroughs Corporation, Detroit, Mich.

[21] Appl. No.: 21,493

[22] Filed: Mar. 19, 1979

[51] Int. Cl.³ .............................................. G03B 27/62
[52] U.S. Cl. ...................................................... 355/75
[58] Field of Search .................................. 355/47–51, 355/75, 35 H; 271/4, 264, 188, 207, 209

[56] References Cited

U.S. PATENT DOCUMENTS 3,912,389  10/1975  Miyamoto ............................ 355/75 X
4,053,223  10/1977  Nebiker et al. ........................... 355/75

Primary Examiner—Richard A. Wintercorn
Attorney, Agent, or Firm—Kevin R. Peterson; Robert A. Green; Edward J. Feeney, Jr.

[57] ABSTRACT

The machine, which may be a facsimile machine, stands on the floor and includes a roll of paper which runs over a stylus assembly, by means of which a pattern of electrostatic charges are formed on the paper, after which the paper is cut and fed downwardly toward the lower end of the machine where it is treated with toner, which is then fused to provide a fixed visible message thereon. The printed document is driven generally upwardly by a roller assembly onto a generally vertically oriented document-receiving tray which is elevated somewhat above the lowest level of the machine at a level which is comfortable for the operator. The tray has a V-shaped document-supporting base, and the apex of the V provides a ridge on which the documents are bent slightly to render them rigid and easy to stack. The roller assembly at the base of the tray is arranged to stiffen the document and facilitate its movement into the tray.

10 Claims, 9 Drawing Figures

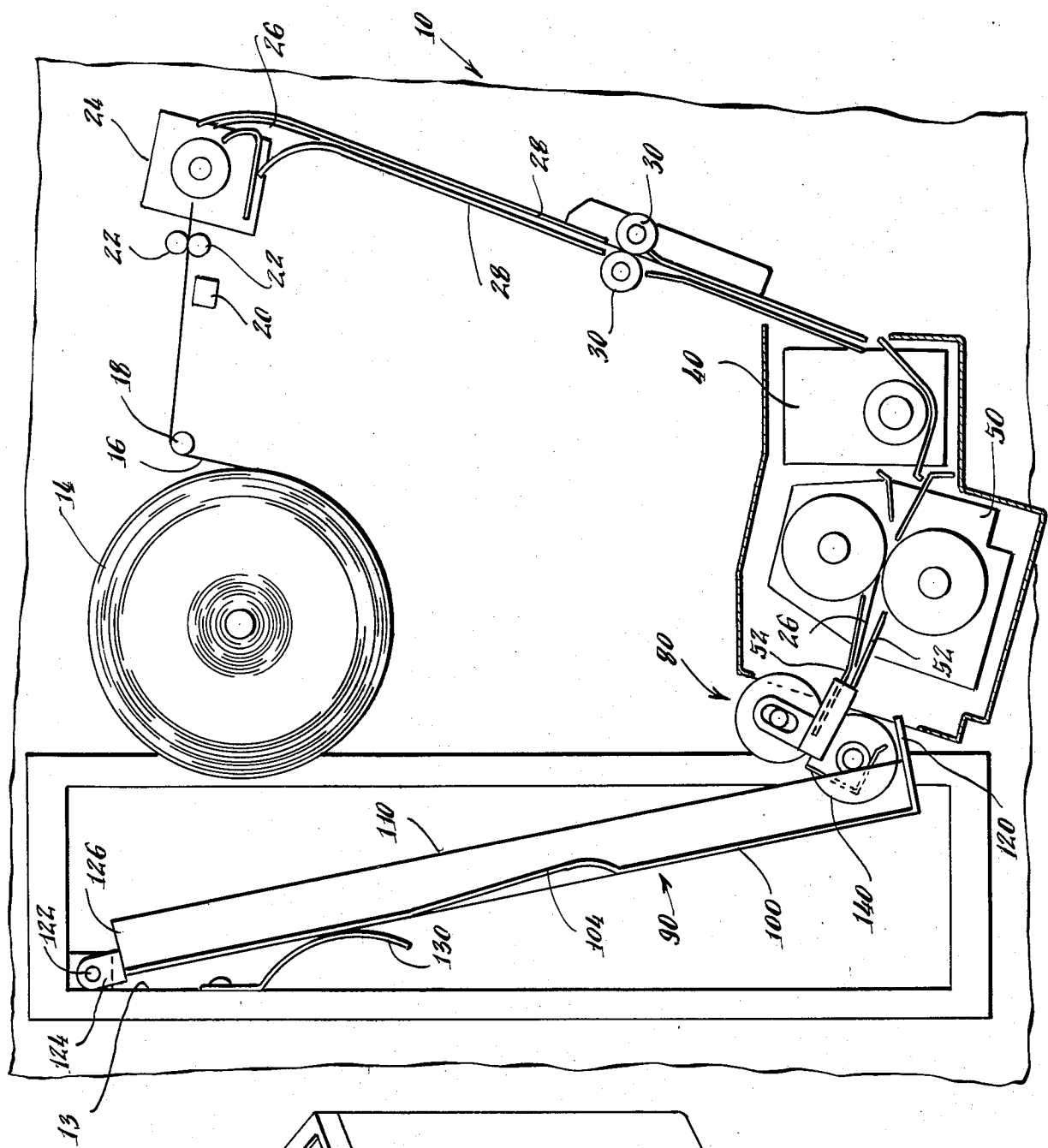
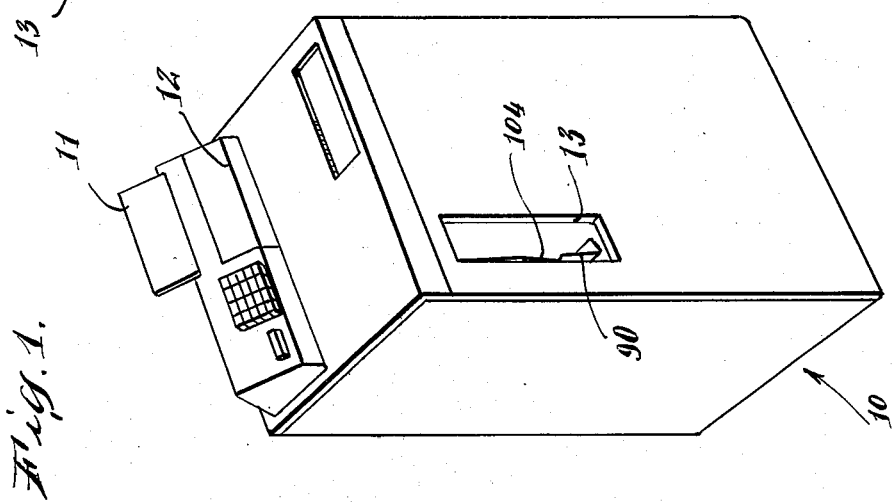

DOCUMENT RECEIVER IN A DOCUMENT PROCESSING MACHINE

BACKGROUND OF THE INVENTION

A new facsimile machine has been developed which is relatively large and stands on the floor. The machine was designed to include a document-scanning section and a document-printing section. For optimum packaging and industrial design of the entire machine, the scanner occupies the upper portion of the machine, and the printer occupies the lower portion, so that finished documents appear at a low level in the machine after the message has been printed thereon. Documents fed out at such a low level in the machine are inconvenient and uncomfortable for an operator to collect and handle. To bring the documents to a higher level, they must be fed vertically and collected in a tray, and these operations are not easy to perform with thin sheets of paper.

The present invention solves this problem by feeding documents from the bottom of the machine onto a tray which is in a generally upright orientation and at a suitable elevation above the bottom of the machine. The feed apparatus and tray include features which stiffen the sheets of paper and thus facilitate the feeding operation.

DESCRIPTION OF THE DRAWINGS

FIG. 1 is a perspective view of apparatus embodying the invention;

FIG. 2 is a side elevational view of the interior of the apparatus of FIG. 1 showing the apparatus of the invention;

DESCRIPTION OF THE PREFERRED EMBODIMENTS

Figure 4:
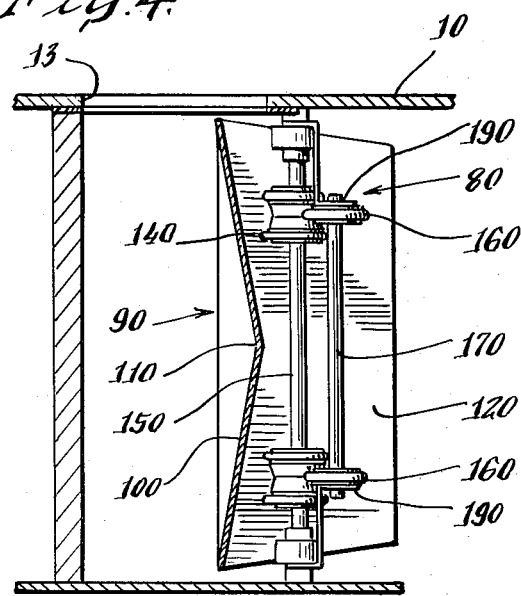
FIG. 4 is a sectional view along the lines 4—4 in FIG. 3.

A facsimile machine 10 with which the invention is used is shown in FIG. 1. The machine is relatively large and is floor-mounted, and documents for transmission are supported on a tray 11 on the top of the machine and are fed into the machine at the top through opening 12, and received documents are extracted through opening 13 in the side wall of the machine. As seen in FIG. 2, the receiver portion of the machine 10 includes a paper roll 14 from which the paper web 16 passes over a guide roll 18 to a signal-receiving apparatus 20 which applies a pattern of electrostatic charges to the web, as is well known in the art. The charged web passes between a pair of feed rollers 22 to a cutter mechanism 24 for severing the electrically charged web or sheet 26 from the roll. All of the apparatus described thus far is positioned generally at an upper level in the machine.

The severed sheet 26 is fed generally downwardly between a pair of guide plates 28 and between intermediate rollers 30 through a developer 40 and fuser 50 which render visible and set the message printed on the paper sheet 26. The developer and fuser are positioned at a relatively low level in the machine, and the printed document 26 thus appears at a relatively low level in the machine. Other guide plates 52 and rollers may be provided as required, as well as control switches and the like.

Figure 8:
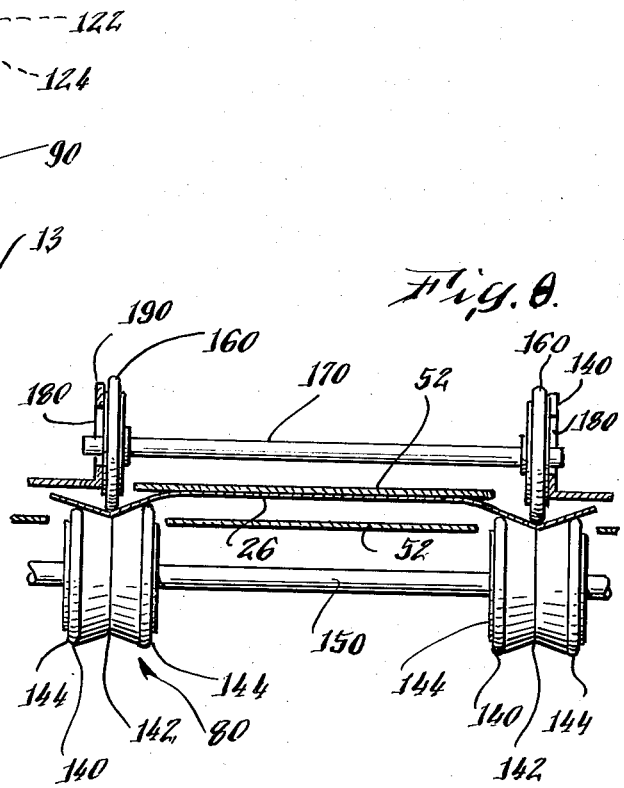
FIG. 8 is a sectional view along the lines 8—8 in FIG. 3.
Figure 9:
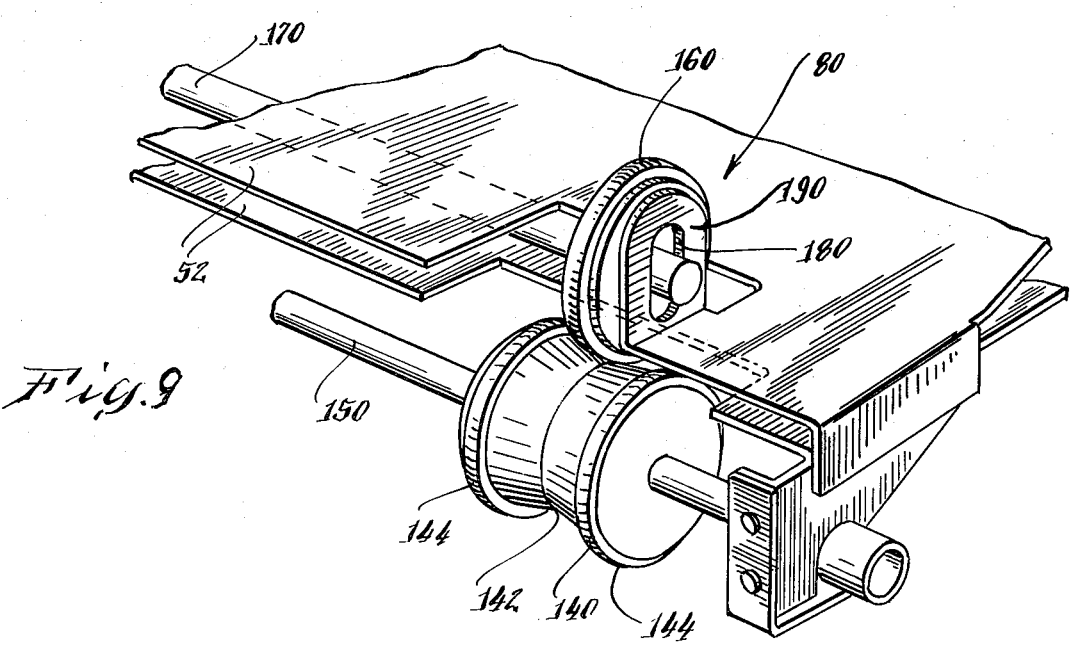
FIG. 9 is an enlarged perspective view of a portion of the apparatus of the invention.

According to the invention, as the printed document 26 leaves the fuser 50, it approaches a roller assembly 80 which includes two spaced-apart coaxial lower rollers 140 mounted on a horizontal shaft 150 which is disposed on an axis which is perpendicular to the front of the machine which faces the viewer in FIG. 1. The lower rollers 140 have a generally V-shaped or concave hub 142 (FIG. 8) between outer rubber rims 144. A second pair of rubber rollers 160 are mounted coaxially and spaced apart on a second horizontal shaft 170, which is parallel to and above the first shaft 150, and they are positioned so that their rims rest on the concave hubs 142 of the upper rollers 140 (FIG. 8). The ends of the second shaft 170 are seated in slots 180 in brackets 190 which permit rollers 160 to float with respect to the lower rollers 140. The brackets 190 are suitably supported on the machine frame.

Figure 6:
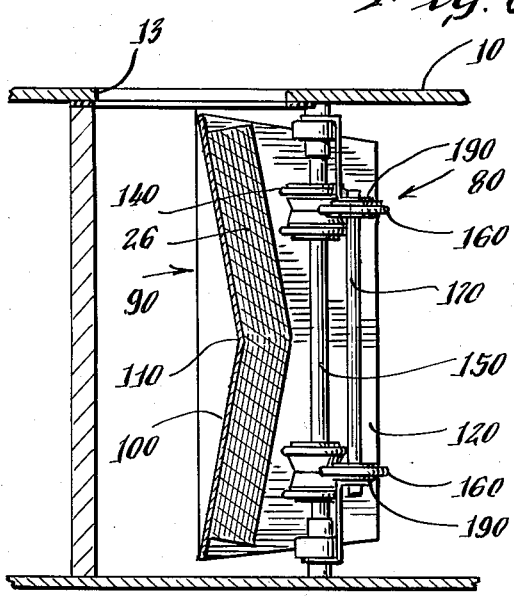
FIG. 6 is a sectional view along the lines 6—6 in FIG. 5.
Figure 3:
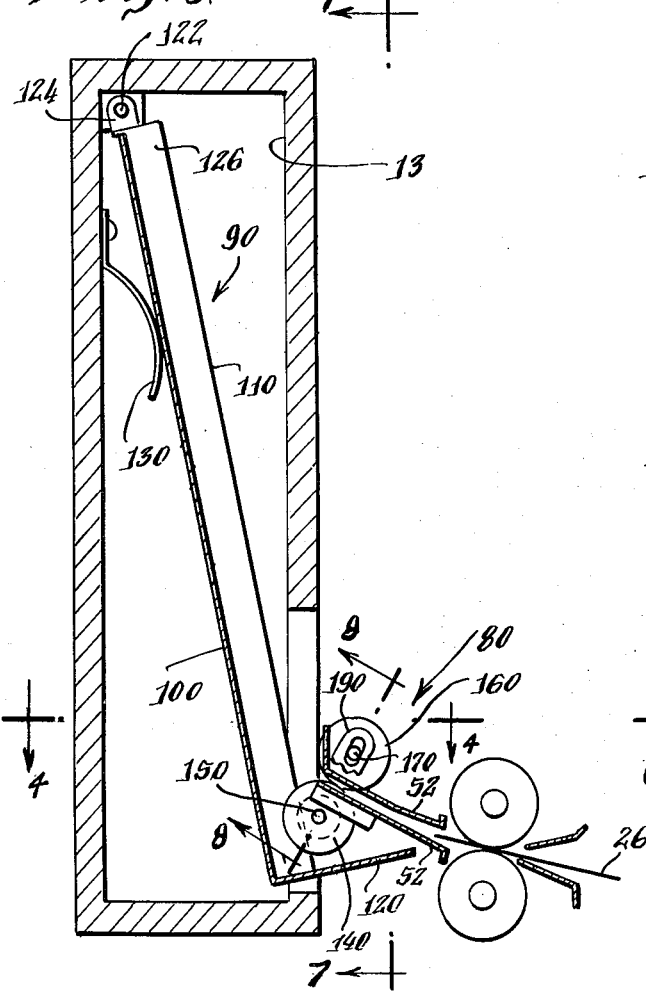
FIG. 3 is a side elevational view of the apparatus of the invention with no sheets collected.
Figure 5:
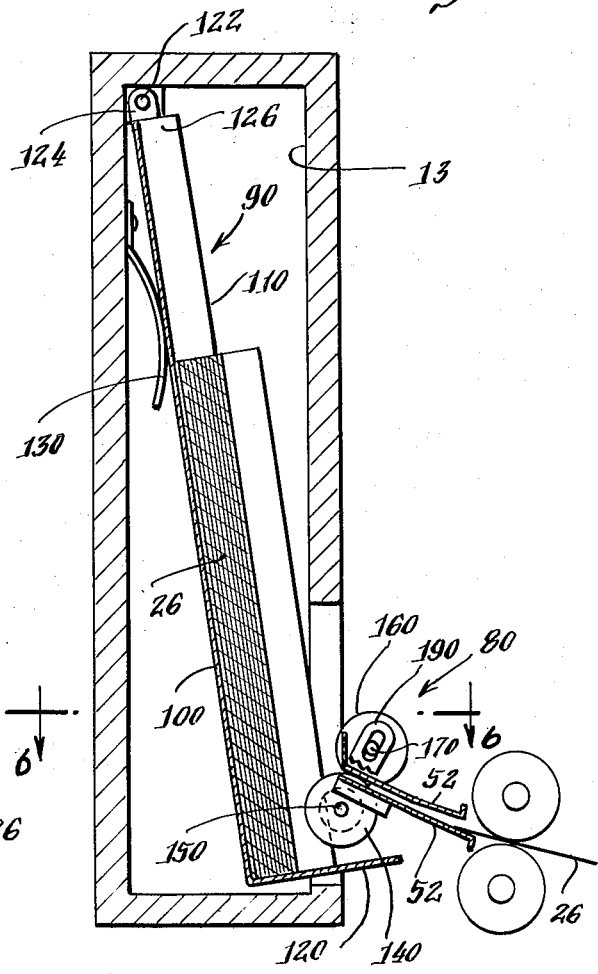
FIG. 5 is a side elevational view of the apparatus of FIG. 3 with a stack of sheets carried thereby.
Figure 7:
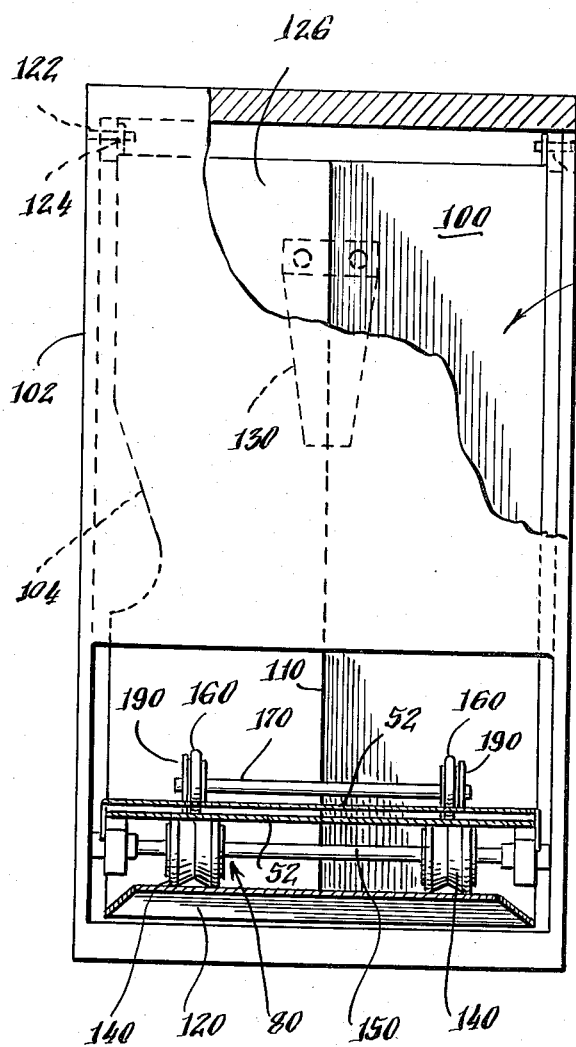
FIG. 7 is a view looking into the apparatus of the invention.

Positioned to the left of the roller assembly, as seen in FIGS. 2, 3, and 5, is an L-shaped tray 90 which is generally vertically disposed and faces the document 26 as it leaves the fuser 50. The tray includes a base 100, which is a generally flat plate, and a shelf or lip 120 which extends perpendicularly from the lower edge of the base 100. The base is a plate which has its front surface slightly V-shaped, with the apex of the V forming a ridge 110 which extends vertically up and down from the lip 120 to the upper end 126 of the base. The shelf 120 extends toward and just under the lower rollers 140. The edge 102 of the base 100 of the tray which is closest to the operator of the machine in FIG. 1 and is the left hand edge in FIG. 7 and the lower edge in FIGS. 4 and 6, is provided with a cutout portion 104 to facilitate the gripping and removal of a stack of sheets by the operator.

The upper end 126 of the base 100 is pivotally coupled by horizontal post 122 to a vertical support wall 124 in the machine so that the tray tends to pivot about a horizontal axis, provided by the post 122, toward the rollers. This movement is urged by a leaf spring 130 secured between the rear surface of base 100 and the wall of the machine.

It is noted that the tray 90 is positioned in the opening 13 in the machine housing, and thus is accessible to an operator through this opening.

As documents 26 approach the rollers, they pass between the two sets of rollers 140 and 160 which, due to their configuration, introduce a slight buckle into each sheet (FIG. 8) to stiffen it so that the sheet feeds straight to the tray 90 before bending upward to follow the slope of the tray. At the trailing end of the paper, the positioning of the upper rollers 160 between the rims of the lower rollers assures that the paper's trailing edge is pushed over the top of the lower rollers. The lower rollers then drive the paper down to the lip 120 of the tray where the paper is stacked squarely. The V-shape of the front surface of the tray also bends each sheet of paper as it falls onto the tray and provides an additional stiffening action which facilitates holding the sheets in place on the upright tray. FIGS. 5 and 6 show the tray with a stack of sheets 26 thereon. These sheets are removed from the tray through opening 13 in the machine.

Apparatus embodying the invention, which is available commercially, has many advantages. For example, the arrangement of the tray 90 and its spring support 130 permit the tray to bear against lower rollers 140 with a light, continuous force of two to six ounces as the paper stack grows in thickness and weight on the tray. Also, with the two lower rollers 140 spaced and positioned to bend the paper 26 over the center ridge 110 of the document tray, the sheets may be stacked as close as 5° from vertical, and as many as two hundred sheets of 0.003" thick paper can be stored on the tray. Also, it is noted that the rollers 140 are not driven, and they turn only when the machine feeds paper over them, so that they do not mark sheets which are piled on the tray as the rollers slip on these sheets.

What is claimed is:

1. Document receiving and storing apparatus comprising
   a generally L-shaped tray including a generally vertical base having an upper end and a lower end, and a lip extending perpendicularly from the base at the lower end thereof,
   a first pair of first rollers freely rotatably mounted on a first horizontal shaft disposed parallel to and adjacent to said lip,
   a second pair of second rollers freely rotatably mounted on a second horizontal shaft disposed parallel to said first shaft, said second rollers being positioned so that each second roller engages the hub of one of said first rollers,
   the base of said tray having a top surface which has a longitudinal ridge which extends along its length, said ridge causing sheets of paper on said tray to bend and thereby experience a stiffening effect.

2. The apparatus of claim 1 wherein said first rollers have generally concave hubs and rubber rims.

3. Document receiving and storing apparatus comprising
   a source of documents,
   a generally L-shaped tray including a generally vertical base having an upper end and a lower end, and a lip extending perpendicularly from the base at the lower end thereof, said lip extending generally toward said documents,
   a first pair of first rollers freely rotatably mounted on a first horizontal shaft disposed parallel to and adjacent to said lip, and
   a second pair of second rollers freely rotatably mounted on a second horizontal shaft disposed parallel to said first shaft, said second rollers being positioned so that each second roller is narrower than the first rollers and rests in contact with the hub of an adjacent corresponding first roller,
   each document being positioned to move between said first and second pairs of rollers onto said tray, the engagement of the first and second rollers acting to bend and stiffen each sheet as it passes between the pairs of rollers to facilitate the feeding of each sheet onto the tray.

4. The apparatus defined in claim 3 and including a bracket on which said second horizontal shaft of said second rollers is mounted for free movement with respect to said first rollers.

5. The apparatus defined in claim 3 and including a pair of spaced-apart horizontal guide plates between which said documents pass as they move toward said first and second rollers.

6. The apparatus defined in claim 3 wherein each first roller has spaced-apart rubber rims.

7. The apparatus defined in claim 6 wherein each of said second rollers is each disposed generally midway between the rims of the adjacent first roller.

8. The apparatus defined in claim 3 wherein said tray is oriented generally vertically and is mounted for pivotal movement at its upper end remote from said lip.

9. The apparatus defined in claim 8 and including a spring disposed behind said tray to provide a cushioning action therefor.

10. The apparatus of claim 3 wherein the base of said tray has a top surface which has a longitudinal ridge which extends along its length to provide a bending and stiffening action on sheets of paper supported thereon.

* * * * *